US011825312B2

(12) United States Patent
Nakahira et al.

(10) Patent No.: US 11,825,312 B2
(45) Date of Patent: Nov. 21, 2023

(54) WIRELESS BASE STATION INSTALLATION POSITION CALCULATION METHOD AND INSTALLATION POSITION CALCULATION DEVICE

(71) Applicant: NIPPON TELEGRAPH AND TELEPHONE CORPORATION, Tokyo (JP)

(72) Inventors: Toshiro Nakahira, Musashino (JP); Hirantha Abeysekera, Musashino (JP); Koichi Ishihara, Musashino (JP); Takafumi Hayashi, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 111 days.

(21) Appl. No.: 17/440,314

(22) PCT Filed: Mar. 16, 2020

(86) PCT No.: PCT/JP2020/011496
§ 371 (c)(1),
(2) Date: Sep. 17, 2021

(87) PCT Pub. No.: WO2020/203229
PCT Pub. Date: Oct. 8, 2020

(65) Prior Publication Data
US 2022/0150715 A1   May 12, 2022

(30) Foreign Application Priority Data

Mar. 29, 2019   (JP) .................................. 2019-068936

(51) Int. Cl.
*H04W 16/20* (2009.01)
*H04B 17/27* (2015.01)
(Continued)

(52) U.S. Cl.
CPC ............ *H04W 16/20* (2013.01); *H04B 17/27* (2015.01); *H04B 17/3912* (2015.01); *H04W 84/12* (2013.01)

(58) Field of Classification Search
CPC ...... H04W 16/20; H04W 84/12; H04B 17/27; H04B 17/3912
See application file for complete search history.

(56) References Cited

U.S. PATENT DOCUMENTS

2015/0103658 A1* 4/2015 Okuno .............. H04W 28/0289
370/232
2015/0156640 A1* 6/2015 Nguyen ................ H04W 16/18
455/422.1

OTHER PUBLICATIONS

IEEE Std 802.11-2016, Dec. 2016.
(Continued)

*Primary Examiner* — Duc C Ho
(74) *Attorney, Agent, or Firm* — Harness, Dickey & Pierce, P.L.C.

(57) ABSTRACT

This disclosure provides a method for calculating the installation number and installation positions of wireless base stations in accordance with the positions of wireless terminal stations within an installation area. First, when a predetermined number of wireless base stations are temporarily installed within the installation area, a wireless base station accommodating each wireless terminal station in a communication area is determined and the number of wireless base stations accommodating each wireless terminal station is calculated as a "number of conflicts". Next, wireless base stations successively accommodating starting with an un-accommodated wireless terminal station of a small number of conflicts are successively selected as objects of installation. Then, the installation number and installation positions of the wireless base stations are calculated, with the temporarily installed wireless base stations other than the wire- (Continued)

less base stations serving as the objects of installation being excluded.

7 Claims, 8 Drawing Sheets

(51) Int. Cl.
  *H04B 17/391* (2015.01)
  *H04W 84/12* (2009.01)

(56) References Cited

OTHER PUBLICATIONS

Takuto Arai et al., "AMAP: Adaptive Movable Access Point System for Offloading Efficiency Enhancement", *IEICE*, RCS2016-43, pp. 107-112, May 2016.
J. Macqueen, "Some Methods for Classification and Analysis of Multivariate Observations", Proc. of 5th Berkeley Symposium on Mathematical Statistics and Probability, pp. 281-297, 1967.
International Search Report Issued in PCT/JP2020/011496, dated Apr. 7, 2020.

* cited by examiner

Fig. 4

| UN-SORTED | | RADIO BASE STATION | | | | | | | | | BASE STATION NUMBER OF CONFLICTS |
|---|---|---|---|---|---|---|---|---|---|---|---|
| | | 1-1 | 1-2 | 1-3 | 1-4 | 1-5 | 1-6 | 1-7 | 1-8 | 1-9 | |
| RADIO TERMINAL STATION | 2-1 | ○ | ○ | | ○ | ○ | | | | | 4 |
| | 2-2 | | ○ | ○ | | | | | | | 2 |
| | 2-3 | | | ○ | | | | | | | 1 |
| | 2-4 | | ○ | | | ○ | | | ○ | | 3 |
| | 2-5 | | | | ○ | ○ | | ○ | ○ | | 4 |
| | 2-6 | | | | ○ | | | ○ | | | 2 |

Fig. 5

| TERMINAL STATION SORTING | | RADIO BASE STATION | | | | | | | | | BASE STATION NUMBER OF CONFLICTS |
|---|---|---|---|---|---|---|---|---|---|---|---|
| | | 1-1 | 1-2 | 1-3 | 1-4 | 1-5 | 1-6 | 1-7 | 1-8 | 1-9 | |
| RADIO TERMINAL STATION | 2-3 | | | ○ | | | | | | | 1 |
| | 2-2 | | ○ | ○ | | | | | | | 2 |
| | 2-6 | | | | ○ | | | ○ | | | 2 |
| | 2-4 | | ○ | | | ○ | | | ○ | | 3 |
| | 2-1 | ○ | ○ | | ○ | ○ | | | | | 4 |
| | 2-5 | | | | ○ | ○ | | ○ | ○ | | 4 |

Fig. 6

| BASE STATION SORTING | | RADIO BASE STATION | | | | | | | | | BASE STATION NUMBER OF CONFLICTS |
|---|---|---|---|---|---|---|---|---|---|---|---|
| | | 1-3 | 1-2 | 1-4 | 1-7 | 1-5 | 1-8 | 1-1 | 1-6 | 1-9 | |
| RADIO TERMINAL STATION | 2-3 | ○ | | | | | | | | | 1 |
| | 2-2 | ○ | ○ | | | | | | | | 2 |
| | 2-6 | | | ○ | ○ | | | | | | 2 |
| | 2-4 | | ○ | | | ○ | ○ | | | | 3 |
| | 2-1 | | ○ | ○ | | ○ | | ○ | | | 4 |
| | 2-5 | | | ○ | ○ | ○ | ○ | | | | 4 |
| MINIMUM VALUE OF NUMBER OF CONFLICTS | | 1 | 2 | 2 | 2 | 3 | 3 | 4 | — | — | |

Fig. 7

| BASE STATION SORTING | | RADIO BASE STATION | | | | | | | | | BASE STATION NUMBER OF CONFLICTS |
|---|---|---|---|---|---|---|---|---|---|---|---|
| | | 1-3 | 1-2 | 1-4 | 1-7 | 1-5 | 1-8 | 1-1 | 1-6 | 1-9 | |
| RADIO TERMINAL STATION | 2-3 | ●* | | | | | | | | | 1 |
| | 2-2 | ● | ○ | | | | | | | | 2 |
| | 2-6 | | | ●* | ○ | | | | | | 2 |
| | 2-4 | | ○ | | | ●* | ○ | | | | 3 |
| | 2-1 | | ○ | ● | | ● | | ○ | | | 4 |
| | 2-5 | | | ● | ○ | ● | ○ | | | | 4 |
| MINIMUM VALUE OF NUMBER OF CONFLICTS | | 1 | 2 | 2 | 2 | 3 | 3 | 4 | — | — | |

Fig. 8

| BASE STATION SORTING | | RADIO BASE STATION | | | | | | | | | BASE STATION NUMBER OF CONFLICTS |
|---|---|---|---|---|---|---|---|---|---|---|---|
| | | 1-3 | 1-2 | 1-4 | 1-7 | 1-5 | 1-8 | 1-1 | 1-6 | 1-9 | |
| RADIO TERMINAL STATION | 2-3 | ●* | | | | | | | | | 1 |
| | 2-2 | ● | ● | | | | | | | | 2 |
| | 2-6 | | | ●* | ○ | | | | | | 2 |
| | 2-4 | | ●* | | | ○ | ○ | | | | 3 |
| | 2-1 | | ● | ● | | ○ | | ○ | | | 4 |
| | 2-5 | | | ● | ○ | ○ | ○ | | | | 4 |
| MINIMUM VALUE OF NUMBER OF CONFLICTS | | 1 | 2 | 2 | 2 | 3 | 3 | 4 | — | — | |

WIRELESS BASE STATION INSTALLATION POSITION CALCULATION METHOD AND INSTALLATION POSITION CALCULATION DEVICE

CROSS-REFERENCE TO RELATED APPLICATIONS

This application is a 371 U.S. National Phase of International Application No. PCT/JP2020/011496 filed on Mar. 16, 2020 which claims priority to Japanese Application No. 2019-068936 filed on Mar. 29, 2019. The entire disclosures of the above applications are incorporated herein by reference.

TECHNICAL FIELD

The present invention relates to an installation position calculation method for calculating a wireless base station installation position in accordance with the position of a wireless terminal station and an installation position calculation device.

BACKGROUND ART

In recent years, with the rapid spread of a wireless terminal station such as a smartphone and a tablet, the number of people utilizing large-capacity contents by a wireless terminal station has increased, and radio traffic has rapidly increased. To accommodate the rapidly increasing radio traffic at low cost and with ease, it is to be expected that, from now on, it will be more important to utilize IEEE802.11 wireless LAN standard (Non-Patent Literature 1) or the like, which has been widely spread as a high-speed wireless access system using radio waves of a wireless system license unnecessary band. A wireless LAN network has been widely provided in various areas including a private area such as a home and an office and a public area such as a shop, a railroad station, and an airport.

In the construction of a wireless LAN network, there are combined various elements including construction portions such as a wireless base station, wiring, and power source equipment, radio communication portion such as wireless LAN parameter setting, network portions such as an interval between a wireless base station and switch and an interval between a switch and a backhaul line, and a wireless LAN service portion such as a terminal-authentication/portal screen. Of these, attention will be paid to the installation position of the wireless base station at the construction portion.

Generally speaking, in radio communication, when the radio signal is attenuated as a result of the propagation of the radio waves, deterioration in the radio communication quality and a reduction in capacity are involved, so that it is desirable for the distance between the wireless base station and the wireless terminal station to be short. On the other hand, the number of wireless base stations installed is restricted by the apparatus, installation, and operation cost, radio wave interference, etc., and the installation number is limited. Thus, it is important that the requisite number of wireless base stations should be installed at appropriate positions with respect to the area covered by the wireless LAN. Furthermore, there are restrictions in terms of performance in the traffic and terminal number allowing accommodation with a single wireless base station, and it is important to design the installation position of the wireless base station taking also that into consideration.

For example, Non-Patent Literature 2 discloses a wireless base station installation position calculation method. Here, as a method of dynamically changing the wireless base station position in accordance with fluctuation in the terminal distribution within the area, there is proposed a method in which a wireless terminal station is accommodated in the wireless base station by using a clustering method (k-means method) as disclosed in Non-Patent Literature 3, making it possible to calculate the wireless base station installation position in accordance with the terminal position within the area.

CITATION LIST

Non-Patent Literature

Non-Patent Literature 1: IEEE Std 802.11-2016, December 2016.
Non-Patent Literature 2: "Proposal of an Adaptive Movable AP System Realizing an Improvement in Terms of Off-Load Efficiency," in IEICE technical report RCS2016-43, pp. 107-112, May 2016 by Takuto Arai, Daisuke Goto, Masashi Iwabuchi, Tatsuhiko Iwakuni, and Kazuteru Maruta.
Non-Patent Literature 3: J. Macqueen, "SOME METHODS FOR CLASSIFICATION AND ANALYSIS OF MULTI-VARIATE OBSERVATIONS," Proc. Of 5th Berkeley Symposium on Mathematical Statistics and Probability, pp. 281-297, 1967.

SUMMARY OF THE INVENTION

Technical Problem

As shown in Non-Patent Literature 2, in the conventional method, in the case where the wireless base station installation position is to be calculated in accordance with the position of the wireless terminal station within the area, it is possible to calculate the positions where a fixed number of wireless base stations are to be installed. However, in the case where the requisite wireless terminal stations are accommodated in a number of wireless base stations as small as possible, it has not been examined as to the number of wireless base stations installed allowing the accommodation of the wireless terminal stations within the area, i.e., the method of calculating an optimum number of wireless base stations has not been examined, and the calculation has been difficult to perform.

Furthermore, while it is possible to cover the area all over by installing a sufficient number of wireless base stations, this involves the installation of surplus wireless base stations, resulting in an increase in cost.

It is an object of the present invention to provide a wireless base station installation position calculation method and an installation position calculation device which allow the calculation of optimum number of wireless base stations installed and installation positions in accordance with the positions of wireless terminal stations.

Means for Solving the Problem

According to a first aspect of the invention, there is provided a wireless base station installation position calculation method for calculating the installation number and installation positions of wireless base stations in accordance with the positions of wireless terminal stations within an installation area, the method comprising: a first step in which when a predetermined number of wireless base stations are temporarily installed within the installation area, a wireless base station accommodating each wireless terminal station in a communication area is determined and in which the number of wireless base stations accommodating each wireless terminal station is calculated as a "number of conflicts"; and a second step in which wireless base stations successively accommodating starting with an un-accommodated wireless terminal station of a small number of conflicts are successively selected as objects of installation, wherein the installation number and installation positions are calculated from the wireless base stations serving as the objects of installation.

According to a second aspect of the invention, there is provided a wireless base station installation position calculation method for calculating the installation number and installation positions of wireless base stations in accordance with the positions of wireless terminal stations within an installation area, the method comprising: a first step in which when a predetermined number of wireless base stations are temporarily installed within the installation area, a wireless base station accommodating each wireless terminal station in a communication area is determined and in which the number of wireless base stations accommodating each wireless terminal station is calculated as a "number of conflicts"; a second step in which all the wireless terminal stations are set to be un-accommodated and in which, of the un-accommodated wireless terminal stations, a wireless terminal station in which the number of conflicts of the wireless base stations is minimum is selected; a third step in which, of the wireless base stations accommodating the wireless terminal stations selected in the second step, a wireless base station in which the accommodation number of wireless terminal stations that are un-accommodated at the moment and of a small number of conflicts is maximum is selected as an object of installation; and a fourth step in which, of the wireless terminal stations accommodated in the wireless base station serving as the object of installation, those that are un-accommodated are all set to be accommodated, wherein the second through fourth steps are repeated until there are no un-accommodated wireless terminal stations to select the wireless base station serving as the object of installation in the third step; and the temporarily installed wireless base stations other than the wireless base station serving as the object of installation are excluded to calculate the installation number and installation positions of wireless base stations.

In the wireless base station installation position calculation method according to the second aspect of the invention, in the third step, in the case where, of a plurality of wireless base stations, the accommodation numbers of wireless base stations that are un-accommodated and of a small number of conflicts are the same, the wireless base station of a large accommodation number of wireless terminal stations including accommodated wireless terminal stations is selected. Further, in the third step, in the case where the accommodation numbers of wireless terminal stations including accommodated wireless terminal stations are the same, a wireless base station accommodating a wireless terminal station of a small number of conflicts may be preferentially selected.

According to a third aspect of the invention, there is provided a wireless base station installation position calculation device for calculating the installation number and installation positions of wireless base stations in accordance with the positions of wireless terminal stations within an installation area, the device comprising: number of conflicts calculation means which, when a predetermined number of wireless base stations are temporarily installed within the installation area, determines a wireless base station accommodating each wireless terminal station in a communication area and which calculates the number of wireless base stations accommodating each wireless terminal station as a "number of conflicts"; installation object selection processing means which successively selects wireless base stations successively accommodating starting with an un-accommodated wireless terminal station of a small number of conflicts as objects of installation; and calculation means which excludes the temporarily installed wireless base stations other than the wireless base station serving as the object of installation to calculate the installation number and installation positions of the wireless base stations.

According to a fourth aspect of the invention, there is provided a wireless base station installation position calculation device for calculating the installation number and installation positions of wireless base stations in accordance with the positions of wireless terminal stations within an installation area, the device comprising: number of conflicts calculation means which, when a predetermined number of wireless base stations are temporarily installed within the installation area, determines a wireless base station accommodating each wireless terminal station in a communication area and which calculates the number of wireless base stations accommodating each wireless terminal station as a "number of conflicts"; wireless terminal station selection means which sets all the wireless terminal stations to be un-accommodated and which, of the un-accommodated wireless terminal stations, selects wireless terminal stations in which the number of conflicts of the wireless base stations is minimum; installation object selection means which, of the wireless base stations accommodating the wireless terminal stations selected by the wireless terminal station selection means, selects a wireless base station that accommodates a maximum number of wireless terminal stations that are un-accommodated at the moment and of a small number of conflicts as the object of installation; accommodation processing means which, of the wireless terminal stations accommodated in the wireless base station serving as the object of installation, sets all those that are un-accommodated to be accommodated; and calculation means which repeats from the wireless terminal station selection means to the accommodation processing means until there is no un-accommodated wireless terminal station to select a wireless base station serving as the object of installation by the installation object selection means, and which excludes the temporarily installed wireless base stations other than the wireless base stations serving as the object of installation to calculate the installation number and installation positions of the wireless base stations.

In the wireless base station installation position calculation device according to the fourth aspect of the invention, in the case where the accommodation numbers of wireless base stations that are un-accommodated at the moment and of a small number of conflicts are the same, the installation object selection means selects the wireless base station of a large accommodation number of wireless terminal stations including accommodated wireless terminal stations. Further, in the case where the accommodation numbers of wireless terminal stations including accommodated wireless terminal stations are the same, the installation object selection means may preferentially select a wireless base station accommodating a wireless terminal station of a small number of conflicts.

Effects of the Invention

In accordance with the present invention, wireless base stations are imaginarily arranged at high density, and then there are calculated wireless base stations accommodating wireless terminal stations within an installation area within a communication area; and the wireless base stations successively accommodating starting with a wireless terminal station of a smaller number of conflicts of wireless base stations are selected, whereby it is possible to calculate the requisite minimum installation number and installation positions of the wireless base stations for accommodating the wireless terminal stations within the installation area.

BRIEF DESCRIPTION OF DRAWINGS

FIG. 4 is a diagram illustrating an example of a terminal station accommodating base station list.

FIG. 5 is a diagram illustrating a terminal station sorting result in the terminal station accommodating base station list.

FIG. 6 is a diagram illustrating a base station sorting result in the terminal station accommodating base station list.

FIG. 7 is a diagram illustrating wireless base station selection example 1.

FIG. 8 is a diagram illustrating wireless base station selection example 2.

DESCRIPTION OF EMBODIMENTS

Figure 1:
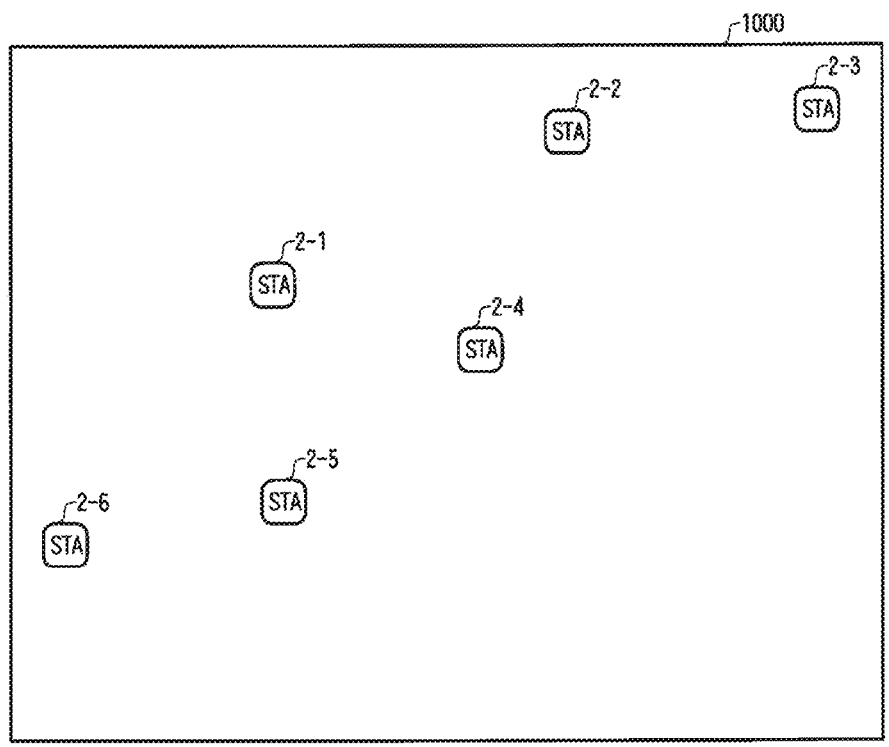
FIG. 1 is a diagram illustrating an installation example of a wireless terminal station in an installation area.

FIG. 1 illustrates a wireless terminal station installation example in an installation area. Here, the installation area means, for example, one floor of an office building, an entire exhibition hall or the like.

FIG. 1 shows how six wireless terminal stations 2-1 through 2-6 are installed at random in an installation area 1000.

Figure 2:
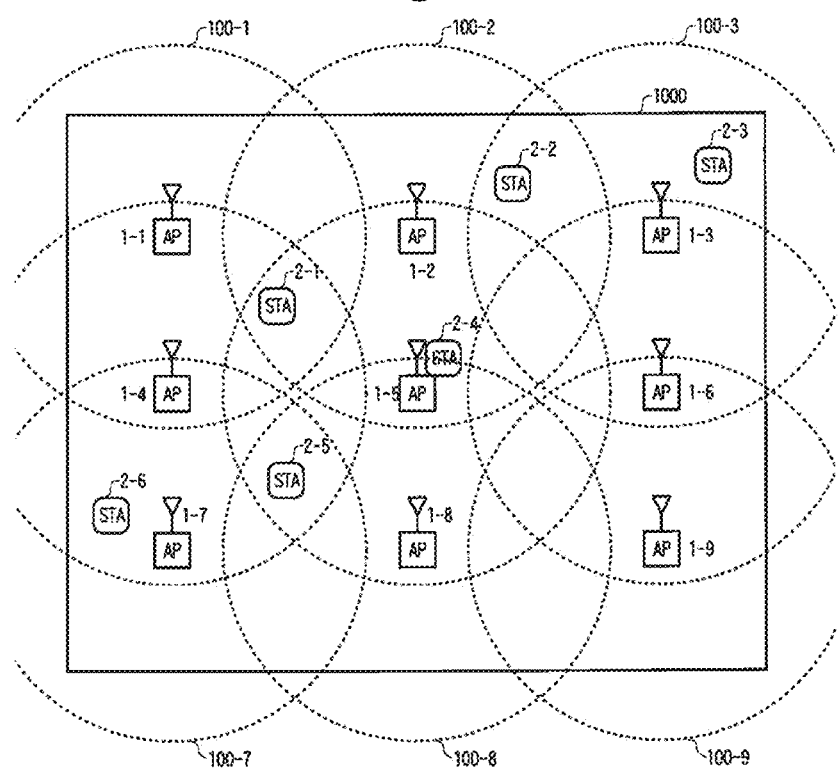
FIG. 2 is a diagram illustrating a temporary installation example of a wireless base station in an installation area.

FIG. 2 illustrates a wireless base station temporary installation example in the installation area.

In FIG. 2, nine wireless base stations 1-1 through 1-9 are temporarily installed uniformly and in a lattice-like fashion, and the wireless base stations respectively form communication areas 100-1 through 100-9 in the installation area 1000. The temporary-installation number of the wireless base stations may be set to an arbitrary number, and, regarding the temporary-installation method, it is possible to adopt various installation modes such as triangular installation and random installation.

To be described in the following are procedures for selecting the temporarily installed wireless base stations 1-1 through 1-9 in order to optimize the installation number and installation positions of the wireless base stations accommodating wireless terminal stations 2-1 through 2-6 of the installation area 1000.

Figure 3:
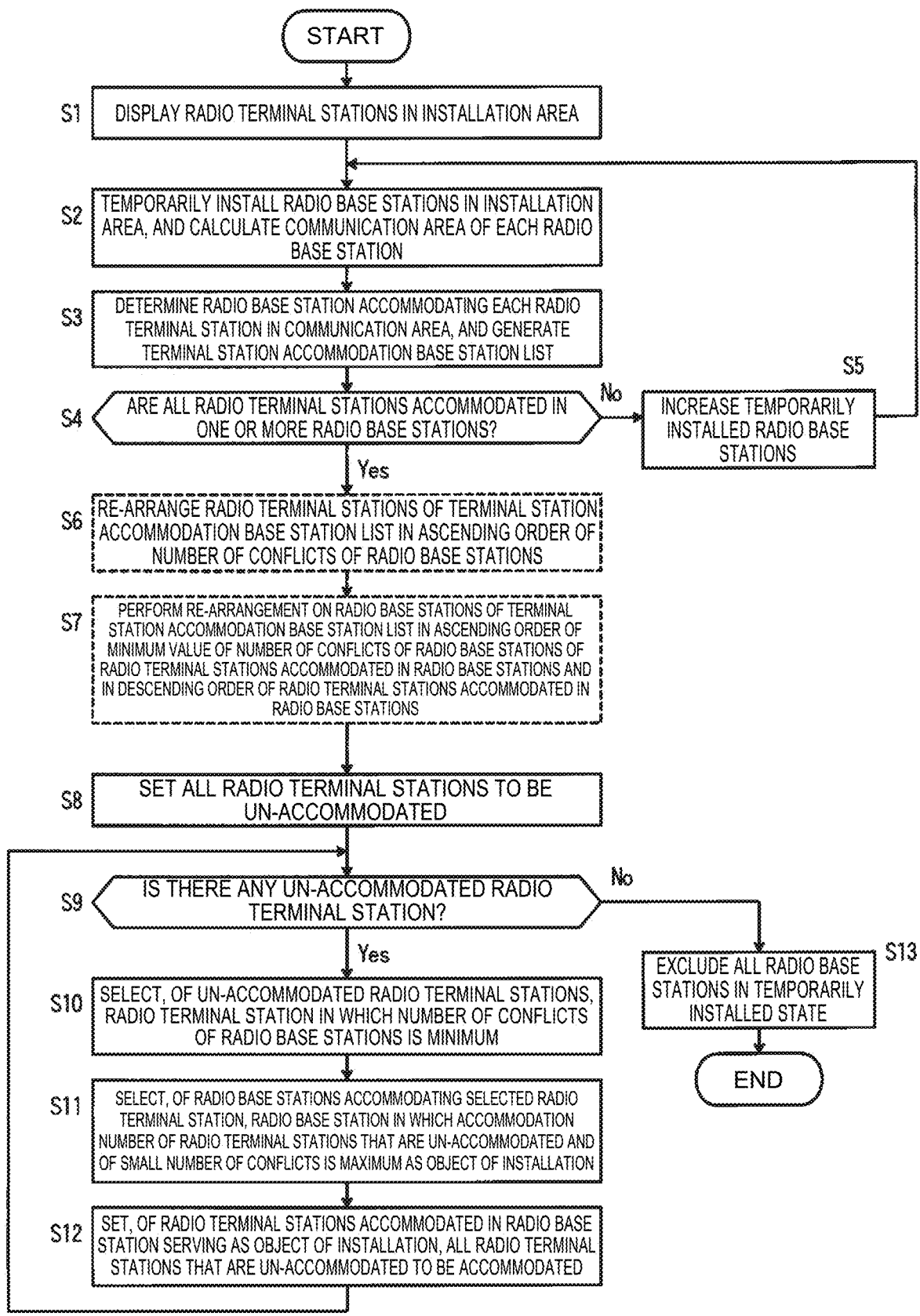
FIG. 3 is a flowchart illustrating an example of processing procedures in the wireless base station installation position calculation method according to the present invention.

FIG. 3 shows a processing procedure example of the wireless base station installation position calculation method according to the present invention.

In FIG. 3, based on wireless base station installation area information and wireless terminal station information, the wireless terminal stations are displayed in the installation area shown in the drawing (step S1). Here, the wireless base station installation area information includes, for example, the size of the installation area (lateral, longitudinal, height), and wireless environment information such as propagation attenuation information (square attenuation). The wireless terminal station information includes, for example, the numbers of the wireless terminal stations, and the installation positions (lateral, longitudinal, and height coordinates) of the wireless terminal stations. In FIG. 1, the wireless terminal stations 2-1 through 2-6 are displayed in the installation area 1000 of the drawing based on the wireless base station installation area information and the wireless terminal station information.

Next, a predetermined number of wireless base stations are temporarily installed in the installation area where the wireless terminal stations are displayed, and the communication area of each wireless base terminal (the wireless terminal station accommodation range) is calculated (step S2). In FIG. 2, the nine wireless base stations 1-1 through 1-9 are temporarily installed in the installation area 1000 of the drawing, with the communication areas 100-1 through 100-9 being displayed.

Next, the wireless base station accommodating each wireless terminal station in the communication area is determined, and a terminal station accommodation base station list is generated (step S3). Further, it is determined whether or not all the wireless terminal stations are accommodated in one or more wireless base station (step S4). In the case where there exists a wireless terminal station accommodated in none of the base stations (No in step S4), the temporary installation number of wireless base stations is increased (step S5), and the procedure returns to step S2 to update the terminal station accommodation base station list.

FIG. 4 shows an example of the terminal station accommodation base station list. Here, in the list, the wireless terminal stations 2-1 through 2-6 are set in rows, and the wireless base stations 1-1 through 1-9 are set in columns, with symbol "0" being imparted to the wireless base stations accommodating wireless terminal stations. The right-most column indicates the number of conflicts of the wireless base stations accommodating each wireless terminal station.

For example, the wireless terminal station 2-1 is accommodated in the wireless base stations 1-1, 1-2, 1-4, and 1-5, and the wireless base station number of conflicts is 4. On the other hand, the wireless terminal station 2-3 is solely accommodated in the wireless base station 1-3, and the wireless base station number of conflicts is 1 (non-conflict). That is, this means that the wireless base station 1-3 is a wireless base station that must be installed without fail in order to accommodate the wireless terminal station 2-3.

In the case where all the wireless terminal stations are accommodated in any wireless base station through the determination in step S4, the wireless base station installation position calculation device re-arranges the wireless terminal stations of the terminal station accommodation base station list of FIG. 4 in the row direction of the table in the ascending order of the wireless base station number of conflicts (step S6). FIG. 5 shows the sorting result. Further, the wireless base station installation position calculation device re-arranges the wireless base stations of the terminal station accommodation base station list of FIG. 5 in the column direction of the table in the manner as described below (step S7). Here, the re-arrangement of the wireless terminal stations accommodated in the wireless base stations is performed in the ascending order of the minimum value of the wireless base station number of conflicts. Here, when there are a plurality of wireless terminal stations in which the wireless base station number of conflicts is minimum, the arrangement is performed in the descending order of the number of wireless terminal stations accommodated in the wireless base stations.

FIG. 6 shows the sorting result. However, the sorting processing of FIGS. 5 and 6 only serves to facilitate the visual understanding of the processing from step S8 onward in which selection is made preferentially in the ascending order of the number of conflicts of the wireless base stations accommodating the wireless terminal stations, and is not indispensable, so that the processing may be omitted and the procedure may advance to step S8.

In the case where all the wireless terminal stations are accommodated in any of the wireless base stations (Yes in step S4), the wireless base station installation position calculation device sets all the wireless terminal stations to be un-accommodated (step S8), and determines whether or not there exists an un-accommodated wireless terminal station (step S9). In the case where there exists such a wireless terminal station (Yes in step S9), the installation position calculation device selects, of the un-accommodated wireless terminal stations, the wireless terminal station in which the wireless base station number of conflicts of the terminal station accommodation base station lists shown in FIGS. 4, 5, and 6 is minimum (step S10). Then, the installation position calculation device selects, of the wireless base stations accommodating the selected wireless terminal station, the wireless base station satisfying the condition mentioned below and establishes it as the object of installation (step S11). Here, there is selected the wireless base station accommodating the maximum number of wireless terminal stations which are un-accommodated at the moment and which are of a small number of conflicts. Next, the installation position calculation device sets, of the wireless terminal stations accommodated in the wireless base station satisfying the above-mentioned condition, all those wireless terminal stations that are un-accommodated to be accommodated (step S12), and the procedure returns to step S9. In step S11, the numbers of wireless terminal stations un-accommodated and of a small number of conflicts in a plurality of wireless base stations are the same, there is selected the wireless base station accommodating a larger number of wireless terminal stations including accommodated wireless terminal stations. Further, in the case where the accommodation numbers of wireless terminal stations including accommodated wireless terminal stations are the same, the one accommodating wireless terminal stations of a smaller number of conflicts may be preferentially selected.

The above-described processing of steps S9 through S12 is repeated, and in the case where there exists no un-accommodated wireless terminal station (No in step S9), the installation position calculation device excludes all the wireless base stations in the temporarily installed state (step S13), and completes the processing, leaving the wireless base station serving as the object of installation. From the wireless base station left as the object of installation, the installation number and the installation positions are clarified.

That is, at the first tour of steps S9 through S12, of the wireless terminal stations un-accommodated in step S10, the number of un-accommodated wireless terminal stations 2-3 in which the wireless base station number of conflicts is minimum (1) is one, so that the installation position calculation device selects that wireless terminal station. Then, in step S11, the wireless base station 1-3 accommodating the wireless terminal station 2-3 is established as the object of installation, and in step S12, the wireless terminal stations 2-3 and 2-2 accommodated in the wireless base station 1-3 are set to be accommodated.

Next, at the second tour of steps S9 through S12, of the wireless terminal stations un-accommodated in steps S9 and S10, there is selected the un-accommodated wireless terminal station 2-6 in which the wireless base station number of conflicts is minimum (2), and, in step S11, of the wireless base stations 1-4 and 1-7 accommodating the wireless terminal station 2-6, there is selected the wireless base station 1-4 accommodating the largest number of un-accommodated wireless terminal stations to be established as the object of installation, and, in step S12, of the wireless terminal stations accommodated in the wireless base station 1-4, the un-accommodated wireless terminal stations 2-6, 2-1, and 2-5 are set to be accommodated.

Next, at the third tour of steps S9 through S12, the installation position calculation device selects, of the wireless terminal stations un-accommodated in steps S9 and S10, the un-accommodated wireless terminal station 2-4 in which the wireless base station number of conflicts is minimum (3). In step S11, of the wireless base stations 1-2, 1-5, and 1-8 accommodating the wireless terminal station 2-4, the wireless base stations in which the accommodation number of wireless terminal stations that are un-accommodated and of a small number of conflicts is maximum and in which the accommodation number of wireless terminal stations including accommodated ones is maximum are the wireless base stations 1-2 and 1-5. The installation position calculation device selects one of them (which is 1-5 in this case) and establishes it as the object of installation, and, in step S12, of the wireless terminal stations accommodated in the wireless base station 1-5, the un-accommodated wireless terminal station 2-4 is set to be accommodated.

Figure 9:
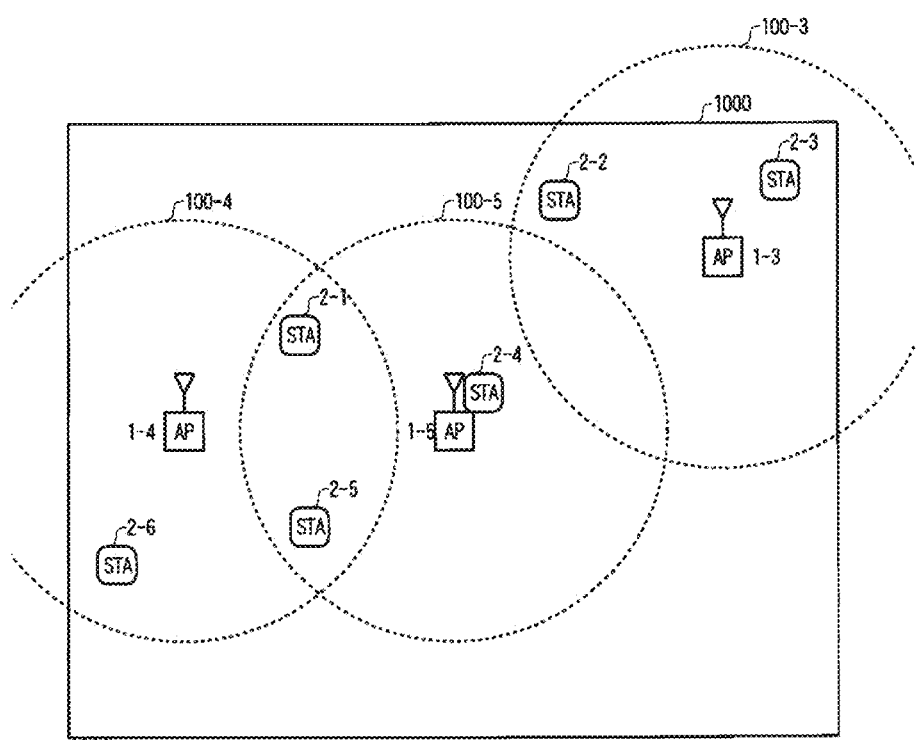
FIG. 9 is a diagram illustrating a result of wireless base station selection example 1.

Through the above-described processing, the wireless base stations 1-3, 1-4, and 1-5 accommodating all the wireless terminal stations are successively selected. In FIG. 7, the wireless terminal stations selected in step S10 are indicated by symbol "*," and symbol "•" indicates how the wireless terminal stations are set to be accommodated in step S12. The result is shown in FIG. 9.

Figure 10:
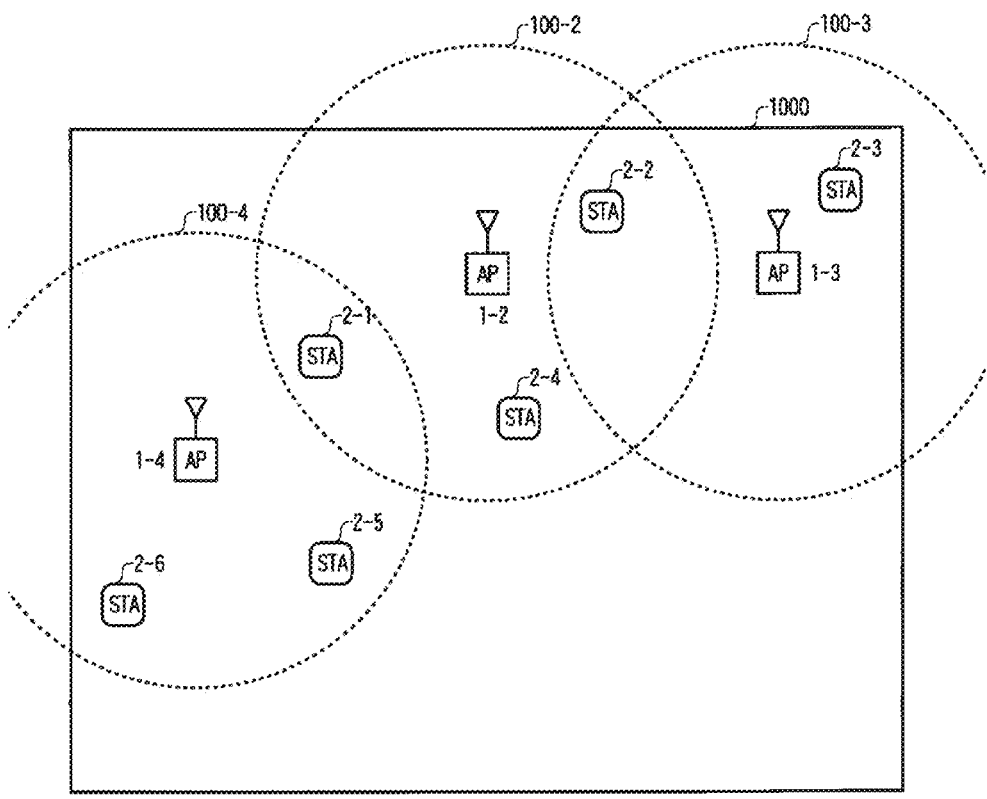
FIG. 10 is a diagram illustrating a result of wireless base station selection example 2.

Suppose, in step S11 at the third tour, the installation position calculation device gives preference to the wireless terminal station of a smaller number of conflicts including the accommodated wireless terminal stations with respect to the wireless base stations 1-2 and 1-5 satisfying the following condition. Then, the un-accommodated wireless terminal station 2-4 is set to be accommodated even if not the wireless base station 1-5 but the wireless base station 1-2 is selected and established as the object of installation. Here, in the above-mentioned wireless base stations 1-2 and 1-5, the accommodation numbers of wireless terminal stations that are un-accommodated and of a small number of conflicts are maximum, and the accommodation numbers of wireless terminal stations including accommodated ones are the same. In this case, the wireless base stations 1-3, 1-4, and 1-2 are selected in that order. Here, these wireless base stations accommodate all the wireless terminal stations. In FIG. 8, the wireless terminal stations selected in step S10 are indicated by symbol "*," and symbol "•" indicates how the wireless terminal stations are set to be accommodated in step S12. The result is shown in FIG. 10.

Through the above-described processing, wireless base stations are imaginarily installed at high density, and then the wireless base stations respectively accommodating wireless terminal stations in the installation area are calculated, and the wireless base stations are selected in the ascending order of the number of conflicts of the wireless base stations accommodating the wireless terminal stations, whereby it is possible to calculate the requisite minimum number of wireless base stations for accommodating the wireless terminal stations in the installation area and the installation positions.

Communication areas 100-1 through 100-9 allowing wireless base stations to accommodate wireless terminal stations can be determined based on the reception sensitivity in radio communication, and further, can be flexibly determined in accordance with the requisite reception intensity and communication quality, and different values can be determined in accordance with the place and the wireless base stations. As a result, it is not only possible to uniformly set the communication areas of the wireless base stations, but also to make setting so as to enhance the quality of part of the communication areas.

REFERENCE SIGNS LIST

1-1 through 1-9 wireless base station
2-1 through 2-6 wireless terminal station
100-1 through 100-9 communication area
1000 installation area

The invention claimed is:

1. A wireless base station installation position calculation method for calculating the installation number and installation positions of wireless base stations in accordance with the positions of wireless terminal stations within an installation area, the method comprising:
    when a predetermined number of wireless base stations are temporarily installed within the installation area, determining a wireless base station accommodating each wireless terminal station in a communication area to calculate the number of wireless base stations accommodating each wireless terminal station as a "number of conflicts";
    successively selecting wireless base stations successively accommodating starting with an un-accommodated wireless terminal station of a small number of conflicts as objects of installation; and
    calculating the installation number and installation positions of the wireless base stations are calculated, with the temporarily installed wireless base stations other than the wireless base stations serving as the objects of installation being excluded.

2. A wireless base station installation position calculation method for calculating the installation number and installation positions of wireless base stations in accordance with the positions of wireless terminal stations within an installation area, the method comprising:
    when a predetermined number of wireless base stations are temporarily installed within the installation area, determining a wireless base station accommodating each wireless terminal station in a communication area to calculate the number of wireless base stations accommodating each wireless terminal station is calculated as a "number of conflicts";
    setting all the wireless terminal stations to be un-accommodated to select, of the un-accommodated wireless terminal stations, a wireless terminal station in which the number of conflicts of the wireless base stations is minimum;
    selecting, of the wireless base stations accommodating the wireless terminal stations selected in the setting to be un-accommodated, a wireless base station in which the accommodation number of wireless terminal stations that are un-accommodated at the moment and of a small number of conflicts is maximum as an object of installation;
    setting, of the wireless terminal stations accommodated in the wireless base station serving as the object of installation, all those that are un-accommodated to be accommodated;
    repeating the determining, the setting to be un-accommodated, the selecting and the setting to be accommodated until there are no un-accommodated wireless terminal stations to select the wireless base station serving as the object of installation in the selecting; and
    excluding the temporarily installed wireless base stations other than the wireless base station serving as the object of installation to calculate the installation number and installation positions of wireless base stations.

3. The wireless base station installation position calculation method according to claim 2, wherein the selecting comprises, in the case where, of a plurality of wireless base stations, the accommodation numbers of wireless base stations that are un-accommodated at the moment and of a small number of conflicts are the same, selecting the wireless base station of a large accommodation number of wireless terminal stations including accommodated wireless terminal stations.

4. The wireless base station installation position calculation method according to claim 3, wherein the selecting further comprises, in the case where the accommodation numbers of wireless terminal stations including accommodated wireless terminal stations are the same, preferentially selecting a wireless base station accommodating a wireless terminal station of a small number of conflicts.

5. A wireless base station installation position calculation device for calculating the installation number and installation positions of wireless base stations in accordance with the positions of wireless terminal stations within an installation area, the device configured to execute:
    when a predetermined number of wireless base stations are temporarily installed within the installation area, determining a wireless base station accommodating each wireless terminal station in a communication area to calculate the number of wireless base stations accommodating each wireless terminal station as a "number of conflicts";
    setting all the wireless terminal stations to be un-accommodated to select, of the un-accommodated wireless terminal stations, wireless terminal stations in which the number of conflicts of the wireless base stations is minimum;
    selecting, of the wireless base stations accommodating the wireless terminal stations selected in the setting to be un-accommodated, a wireless base station that accommodates a maximum number of wireless terminal stations that are un-accommodated at the moment and of a small number of conflicts as the object of installation;
    setting, of the wireless terminal stations accommodated in the wireless base station serving as the object of installation, all those that are un-accommodated to be accommodated;

repeating from the determining to the setting to be accommodated until there is no un-accommodated wireless terminal station to select a wireless base station serving as the object of installation in the selecting; and excluding the temporarily installed wireless base stations other than the wireless base stations serving as the object of installation to calculate the installation number and installation positions of the wireless base stations.

6. The wireless base station installation position calculation device according to claim 5, wherein the selecting comprises, in the case where the accommodation numbers of wireless base stations that are un-accommodated at the moment and of a small number of conflicts are the same, selecting the wireless base station of a large accommodation number of wireless terminal stations including accommodated wireless terminal stations.

7. The wireless base station installation position calculation device according to claim 6, wherein the selecting further comprises, in the case where the accommodation numbers of wireless terminal stations including accommodated wireless terminal stations are the same, preferentially selecting a wireless base station accommodating a wireless terminal station of a small number of conflicts.

* * * * *